United States Patent Office 3,365,264
Patented Jan. 23, 1968

3,365,264
DYEING METALLIZED POLYOLEFIN WITH QUINOLINE DYES
Paul L. Stright, Erie County, N.Y., assignor to Allied Chemical Corporation, New York, N.Y., a corporation of New York
No Drawing. Original applications Feb. 12, 1963, Ser. No. 257,889, and Feb. 28, 1963, Ser. No. 261,858, now Patent No. 3,254,072, dated May 31, 1966. Divided and this application Aug. 25, 1965, Ser. No. 482,605
20 Claims. (Cl. 8—42)

ABSTRACT OF THE DISCLOSURE

Alpha-olefins having from 2–4 carbon atoms and containing a small quantity of a Werner complex forming metal are colored in deep shades fast to light by employing a water-insoluble monoazo dyestuff derived from a diazotized 8-aminoquinoline compound and capable of forming a metal chelate with said metal.

---

This application is a divisional of my copending applications Ser. Numbers 257,889 and 261,858 filed Feb. 12, 1963 and Feb. 28, 1963, respectively, the latter having issued as U.S. Patent 3,254,072 on May 31, 1966.

The present invention relates to the dyeing of a-olefin polymers. More particularly, it relates to the dyeing of normally solid polymers of a-olefins having from two to four carbon atoms and containing a small quantity of a Werner complex forming metal. Especially, this invention is directed to the dyeing of polypropylene containing a Werner complex forming metal or compound thereof with water-insoluble monoazo dyestuffs capable of forming a metal chelate with said metal and derived from a diazotized 8-aminoquinoline compound.

Polymers of a-olefins such as ethylene and propylene have been produced in steadily increasing quantities and grades in recent years, and because of their many valuable characteristics of mechanical strength, high elasticity, resistance to solvents and other elements, have found their way into a multitude of useful applications in the form of films, filaments, yarns, fabrics, ropes, molded products and the like. However, because of their extreme chemical inertness and hydrophobic character, these materials have shown little affinity for dyestuffs and pigments generally available for the coloration of natural and synthetic materials. Thus attempts to effect the coloration of poly-a-olefins by compounding pigments into the resin, as in Banbury mixers, compound extruders, etc. were not entirely satisfactory due to the difficulty of obtaining adequate dispersion of the pigment. Dispersed dyestuffs produce light to medium shades in poly-a-olefins although the fastness to light and washing of such colorations leaves much to be desired.

The receptivity of the polymers for known classes of dyestuffs has been improved by grafting or otherwise introducing polymeric chains containing functional groups to the polyolefin. However, such measures while, in part, successfully add to the cost of the resulting fiber.

It has recently been disclosed to dye poly-a-olefin fibers by conventional dyeing procedures by means of aqueous emulsions of oil soluble dyes. Such emulsions when applied to poly-a-olefin textiles in aqueous dyebaths produce light to medium shades of acceptable fastness characteristics, but tend to leave a residue of the carrier oil on the goods, which is removed with difficulty, as by drastic soaping or costly extraction procedures.

Polymers of a-olefins, especially polypropylene, are subject to degradation on exposure to heat and light such as is encountered during mechanical processing as for example in molding, exrtusion, etc., and during exposure of the finished articles such as rugs, draperies, automobile seat covers, to sunlight.

It is known that polymers of a-olefins and especially polypropylene can be stabilized against degradation due to heat and light by incorporating in the polymer various compounds, many of which are compounds, inorganic and organic, of metals, such as nickel, zinc, cobalt, copper, cadmium, titanium, aluminum, iron, zirconium, manganese, vanadium and the like. These metals belong to the transition group of elements and characteristically are capable of forming Werner type complex compounds. Nickel compounds such as the bis(p-alkylphenol)-monosulfide nickel compounds disclosed in U.S. 2,971,940 and 3,006,885 and nickel acetyl-acetonate (Belgium Patent 608,408) as stabilizers for polypropylene, are especially effective in this connection. Inorganic chromium compounds, as disclosed in French Patents 1,142,024 and 1,142,025 are likewise effective in minor amounts as stabilizer for these polymers.

These stabilizing agents are used in relatively small amounts, from about 0.001 to 3% by weight, and are generally incorporated in the polymer during the processing stage. Such small amounts are generally sufficient to provide adequate stabilization of the polymer against degradation by heat and light, and consequently, will be those termed herein as "stabilizing amounts."

It is known, further, that polymers of a-olefins are formed by reacting the olefin monomer in the presence of metal catalysts most, if not all, of which are Werner complex forming metals. Although the preparation of such polymers generally includes a step designed to remove such catalysts, trace amounts, i.e. amounts of the order of 0.002 to 0.01% by weight, generally remain in the polymer product.

It is a principal object of the present invention to provide an effective process for the coloration of normally solid polymers of a-olefins having from 2 to 4 carbon atoms. Another object is to provide a process for dyeing poly-a-olefin fibers in deep shades fast to light. A further object is to provide a process for the dyeing of polypropylene containing a Werner complex forming metal with water insoluble monoazo dyestuffs, of the 8-azo quinoline series, containing chelatable groups.

These and other objects are accomplished according to my invention wherein normally solid polymers of a-olefins having from 2 to 4 carbons per unit and containing Werner complex forming metals or compounds thereof are contacted with an aqueous dispersion of a water-insoluble monoazo dyestuff, obtained by diazotizing 8-aminoquinoline and coupling with a compound containing at least one group chelatable with the metal.

Chelatable azo dyestuffs are well known in the dyestuff art. Such dyestuffs possess a group or groups capable of binding certain metals by means of coordinate and covalent linkages commonly associcated with metal chelate compounds.

The water insoluble dyestuffs useful in the process of my invention correspond to the following general formula:

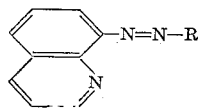

wherein R is the residue of an azo coupling component selected from the group consisting of B-naphthols, 1-aryl-5-pyrazolones, hydroxydiphenylamines, 1,3-propanediones and 2,4-dihydroxyquinolines, and wherein R and the quinoline nucleus may contain substituents other than water-solubilizing groups, e.g. SO₃H, such as alkyl, aryl, alkoxy, halogen, nitro, hydroxy, substituted amino, e.g.

alkylamino, arylamino, acylamino, sulfonamide, carboxyamide, cyano and trifluoromethyl. Dyestuffs of this class are generally old in the art and are referred to as 8-azoquinoline dyestuffs or 8-quinolinyl monoazo dyestuffs. They may be obtained by coupling a diazotized 8-aminoquinoline compound with a suitable coupling component as defined above.

As examples of suitable 8-aminoquinoline compounds the following are mentioned:

8-aminoquinoline
8-aminoquinaldine
8-amino-6-chloroquinoline
8-amino-5-methoxyquinoline
8-amino-5,6-dimethoxyquinoline
8-amino-6-nitroquinoline
8-amino-2,3-dimethylquinoline
8-amino-6-methoxy-5-nitroquinoline
8-amino-7-trifluoromethylquinoline
8-amino-6-(ethylsulfonyl)quinoline
8-amino-5-(N-methylsulfamyl)quinoline
8-amino-6-(phenylsulfonyl)quinoline
8-amino-5,7-dichloroquinoline
8-amino-7-chloro-2,4-dimethylquinoline
8-amino-6-thioethylquinoline
8-amino-6-($\beta$-hydroxyethyl)quinoline
8-amino-6-(n-butylamino)quinoline
8-amino-6-(N,N-dimethylamino)quinoline The following illustrate coupling components (R) suitable for use in preparation of the dyestuffs utilized in my invention:

3-anilinophenol
2-naphthol
6-bromo-2-naphthol
8-acetamido-2-naphthol
8-carboethoxyamino-2-naphthol
1-phenyl-3-methyl-5-pyrazolone
1-(2,3 or 4-chlorophenyl)-3-methyl-5-pyrazolone
1-(2,5-dichlorophenyl)-3-methyl-5-pyrazolone
2,4-dihydroxyquinoline
2,4-pentanedione
1,3-diphenyl-1,3-propanedione
1,3-bis(p-tolyl)-1,3-propanedione
1-phenyl-2,4-pentanedione
1-phenyl-1,3-butanedione
1-(2-furyl)-1,3-butanedione
1,1,1-trifluoro-2,4-pentanedione
6-methoxy-2-naphthol The dyeing of polypropylene and the like with dyestuffs of the aforesaid class is carried out in a manner conventional in the dyeing of dispersed dyestuffs. These water insoluble dyes are applied as aqueous dispersions which can be obtained by various known means. For example, the dyestuff is ground in the presence of a dispersing agent by means of a micropulverizer, sand, inorganic salt and the like. The more finely divided the dyestuff composition is, the more effective as a dye the composition will be, as is generally known. The dispersed dye is admixed with a sufficient quantity of water to obtain a thoroughly wetted paste or slurry, which then is diluted with a further quantity of water to obtain the desired concentration of dyestuff in the ultimate dyebath. For dyeing, the polyolefin material is entered into the dyebath, which may or may not contain the usual dyeing adjuvants, e.g. auxiliary wetting agents, etc., and the dyeing effected by heating the bath to a suitable dyeing temperature and working the material in the heated bath for a sufficient period, usually about one hour, to obtain the desired depth of shade. During the latter period, the addition of dilute acid to a pH of below 5, will result in a better exhaustion of the dyestuff from the dyebath. The dyed material may then be rinsed with water, washed with warm (60° C.) mild soap solution, rinsed again with water and dried.

An effective mode of preparing aqueous dispersion of the 8-azoquinoline dyestuffs suitable for use in this invention, is that described in copending U.S. application Ser. No. 5,123, filed Jan. 28, 1960, now U.S. Patent No. 3,069,220. By the novel procedure disclosed therein, the metallizable monoazo dyestuff is first dissolved in a water-miscible polyhydric alcohol or ether. To this solution is added, with agitation, a surface active agent and water whereby a neutral aqueous dispersion of the dyestuff in finely divided condition results. The initial dispersion may be advantageously prepared with a relatively limited quantity of water to produce a stable concentrated stock dispersion of the monoazo dyestuff. This dispersion can be used to prepare the dyebath by adding aliquot portions to water as and when desired and the polyolefin dyed according to conventional techniques hereinabove described.

The polyolefins are dyed in accordance with the process of my invention in shades which are characterized by their fastness to light, to crocking (or rubbing) and to wet treatments, i.e., to washing and to dry cleaning.

The depth of shade obtained in my novel dyeing procedure will depend upon several factors, the most important of which are (1) The amount of metal present in the polymer, and
(2) The ease with which the metal and chelatable dyestuff react to form the metal chelate compound.

As will be apparent, the amount of Werner complex forming metal available in the polymer will govern the depth of shade produced. Thus, trace amounts of such metal or compound thereof, e.g. 0.002% or more calculated as metal by weight of polymer, will produce light or pastel shades, whereas "stabilizing amounts" (0.01% or more) will yield deep shades. The metal content of the polymer can be augmented by treating the polymer with a solution or dispersion of metal compound prior to dyeing. The metal can also be added during the spinning or the like operation for the specific purpose of improving the dye-ability of the polymer. Amounts of metal in excess of about 3% should not, in general, be added as such amounts may affect the physical properties of the polymer and make it unsatisfactory for the particular use for which it is intended. In general, the range of concentration of 0.1 to 0.5% of metal is adequate to obtain commercially desirable shades.

The depth of shade obtained is affected also, although to a somewhat lesser extent than the metal content of the polymer, by the ease with which the dyestuff reacts with the metal to form the chelate compound.

While I do not wish to be limited by any theory of the mechanism by which my novel procedure operates, I believe that the monoazo dyestuff forms a coordinate complex or chelate with the metal present within the polyolefin. The result is highly surprising in view of the hydrophobic character of the polymer and the well known resistance of such polymers to penetration by water and organic solvents.

The amount of dyestuff employed relative to the amount of polyolefin material to be dyed can be varied over a wide range. The amount used will depend to a major extent upon the depth of shade desired and also upon the metal content of the polymer. In most instances, deep shades can be obtained from 0.5% dyeings, which shades are increased little in intensity by increasing the dye concentration to 2.0% or more. Light shades can be obtained by the use of as little as 0.05% or less of the dyestuff.

The chelatable 8-azoquinoline dyestuffs used in the process of my invention have little or no solubility in the aqueous dyebath, which preferably is maintained at a pH of 5 or less. They are applied in the form of dispersions in the manner of the well known "disperse dye" class. Such dyes, it is known, are in a finely divided condition and usually are assisted by admixture with dispersing agents, which may be of the non-ionic, anionic or cationic groups. The preferred surfactants for the purpose of my invention are of the non-ionic type and especially preferred are those condensation products of ethylene oxide with a hydrophobic material such as a long chain aliphatic alcohol, acid, ester, ether or alkyl phenol. These products are characterized by containing as the hydrophilic portion of the molecule a plurality of oxyethylene moieties as illustrated by the following general formula:

$$R-O-(CH_2CH_2O)_n-CH_2CH_2OH$$

wherein R is an alkyl group having from 12 to 22 carbon atoms or an alkyl phenol residue wherein the alkyl group contains from 6 to 13 carbon atoms inclusive, and wherein $n$ is at least 4 and especially between about 6 and 40.

Examples of products in this preferred group of non-ionic dispersants include:

"Triton X–100" wherein R is the residue of iso-octylphenol and $n$ is 7 to 9;

"Triton X–102" wherein R is the residue of iso-octylphenol and $n$ is 11;

"Tergitol NPX" wherein R is the residue of ethylhexylphenol and $n$ is between 8 and 9;

"Neutronic 600" wherein R is the residue of nonylphenol and $n$ is 9;

"Emulphor ELN" wherein R is the residue of dodecylphenol and $n$ is 19.

Dispersants other than the above described group of non-ionics can be used, if desired, to assist dyeing of poly-a-olefins by the finely divided chelatable monoazo dyestuffs. Further, mixtures of such dispersing agents are contemplated in this connection also.

The following examples illustrate the process of my invention. The temperatures are given in degrees centigrade, parts and percentages are by weight unless otherwise specified.

Example 1

A monoazo dyestuff was prepared from 8-amino-quinoline in the following manner. The base (14.4 g., 0.10 mole) in aqueous hydrochloric acid solution was diazotized with sodium nitrite in the usual manner and the resulting diazo was coupled with alkaline β-naphthol solution (18.4 g., 0.105 mole β-naphthol in 1000 mls. water containing 15 ml. of 50° Bé. sodium hydroxide solution and 200 g. sodium carbonate) at below 10° C. The monoazo compound was isolated, washed free of β-naphthol and dried.

One part of the above monoazo dyestuff was mulled with five parts of diethylene glycol and Triton X–100 (0.1 part) was added. After the addition of about 4000 parts of warm (40° C.) water, 100 parts of "Herculon Type 40" an isotactic polypropylene containing a bis-(p-alkylphenol) monosulfide nickel compound as stabilizer in the amount of about 0.12% of nickel based on the weight of the polypropylene were entered into the dyebath and worked therein as the bath was heated to boiling. The dyeing was continued at the boil for about one hour. The dyed fiber was removed from the bath and washed well with 0.25% soap solution at 60° C. After rinsing in warm water, the dyed fiber was dried. It was colored a deep reddish-violet. The light fastness of the dyed fiber was excellent (about 80 hours in the Fade-ometer). The dyed fiber was also fast to washing, drycleaning and crocking.

Examples 2 to 7

A series of monoazo dyestuffs were prepared from 8-aminoquinoline by diazotization and coupling with various organic compounds. "Herculon Type 40" polypropylene was dyed as described in Example 1 above, using the 8-azoquinoline dyestuffs listed below in Table I. Deep shades of good fastness to light, washing, drycleaning and crocking were obtained as shown below. The various polypropylene dyeings were tested for light fastness using AATCC 16A–1960 standard test. The AATCC ratings signify an appreciable break in color fastness after a certain number of hours in a Fade-Ometer as follows: 2 (rating)=5 hours; 3=10; 4=20; 5=40; 6=80; 7=160; 8=320.

TABLE I

| Example | 8-amino-quinoline Compound | Coupling Component | Shade | Light Features |
|---------|---------------------------|---------------------|-------|----------------|
| 2 | 8-aminoquinoline | 1-phenyl-3-methyl-5-pyrazolone. | Orange | 5 |
| 3 | do | Hydroxy-diphenylamine. | Bluish-red. | 5 |
| 4 | do | Dihydroxyquinolines. | Red-brown. | 4 |
| 5 | do | 2,4-pentanedione | Yellow | 4–5 |
| 6 | do | 1-phenyl-1,3-butanedione. | do | 4 |
| 7 | 6-methoxy-8-aminoquinoline. | B-naphthol | Violet | 5–6 |

The following examples illustrate the shades which are obtained by coloring "stabilized" polypropylene with dyes prepared in accordance with the procedures of Example 1 using the various 8-aminoquinoline compounds and coupling components identified below in Table II.

TABLE II

| Example | 8-aminoquinoline Compound | 1,3-diketone Compound | Shade |
|---------|---------------------------|------------------------|-------|
| 8 | 2-methyl- | 1,3-diphenyl-1,3-propanedione. | Reddish-yellow. |
| 9 | 6-methoxy- | do | Red-yellow. |
| 10 | 2-methyl-6-methoxy- | 2,4-pentanedione | Do. |
| 11 | 5,7-dimethyl- | do | Yellow. |
| 12 | 6-N-methylsulfamyl- | 1,3-bis(p-tolyl)-1,3-propanedione. | Do. |
| 13 | 2-methyl- | 2,4-pentanedione | Do. |
| 14 | do | 1-phenyl-1,3-butanedione. | Red-yellow. |

It can thus be seen that a novel and efficient method has been devised for the dyeing of poly-a-olefins containing a Werner complex forming metal with monoazo dyestuffs derived from 8-amino-quinoline. As will be evident to those skilled in this art, the invention is not limited to the details of the foregoing purely illustrative examples and that changes can be made without departing from the scope or spirit of my invention.

The presence of the Werner complex forming metal (or compound thereof) in an amount sufficient to impart a degree of stabilization of the poly-a-olefin against degradation by heat and/or light is believed necessary to obtain all the beneficial effects of my invention, and hence such amount, e.g. 0.01% or more are to be preferred. The amount of such metal used varies widely depending upon the degree of stabilization the fabricator of the polymer desires to impart.

I claim:

1. A process for dyeing a normally solid polymer of an alpha olefin having 2 to 4 carbon atoms and containing an effective amount of a Werner complex-forming metal dispersed therein which comprises contacting said solid polymer with an aqueous dispersion of a water-insoluble monoazo dyestuff having the formula:

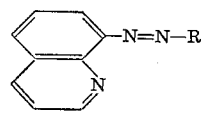

wherein R is the residue of an azo coupling component selected from the group consisting of B-naphthols, 1-aryl-5-pyrazolones, hydroxydiphenylamines, 1,3 - propanediones and 2,4-dihydroxyquinolines and wherein the quinoline nucleus may be further substituted by non-water solubilizing substituents.

2. The process of claim 1 wherein said dispersion is acidic.

3. The process of claim 1 wherein said metal is present in the amount of at least 0.01% by weight of the polymer.

4. The process of claim 1 wherein said polymer is isotactic polypropylene.

5. The process of claim 1 wherein the pH of said aqueous dispersion is about 5.

6. The process of claim 1 wherein said metal is nickel.

7. The process of claim 6 wherein said nickel is present in the form of an organic chelate complex.

8. The process of claim 1 in which the monoazo dyestuff has the formula:

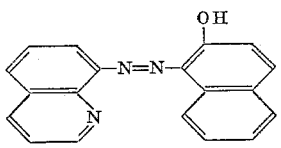

9. The process of claim 1 in which the monoazo dyestuff has the formula:

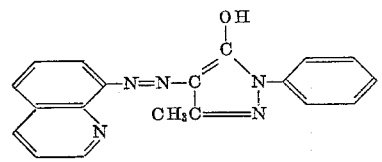

10. The process of claim 1 in which the monoazo dyestuff has the formula:

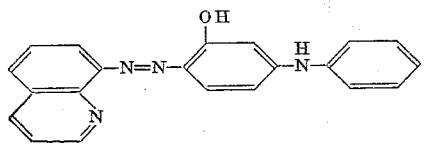

11. The process of claim 1 in which the monoazo dyestuff has the formula:

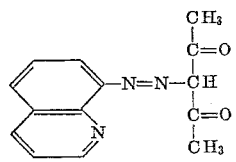

12. The process of claim 1 in which the monoazo dyestuff has the formula:

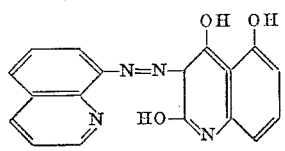

13. Polypropylene dyed by the process of claim 1.
14. Polypropylene dyed by the process of claim 7.
15. Polypropylene dyed by the process of claim 8.
16. Polypropylene dyed by the process of claim 9.
17. Polypropylene dyed by the process of claim 10.
18. Polypropylene dyed by the process of claim 11.
19. Polypropylene dyed by the process of claim 12.
20. The product of claim 1 in which the solid polymer of the alpha olefin is in the form of a fiber.

References Cited

UNITED STATES PATENTS 3,203,752  8/1965  Mills et al. _____ 8—75

J. TRAVIS BROWN, *Acting Primary Examiner.*

D. LEVY, *Assistant Examiner.*